United States Patent
Nilsson et al.

(10) Patent No.: US 11,142,152 B2
(45) Date of Patent: Oct. 12, 2021

(54) BUMPER BEAM WITH REINFORCEMENT PATCH

(71) Applicant: GESTAMP HARDTECH AB, Luleå (SE)

(72) Inventors: Johan Nilsson, Luleå (SE); David Gustafsson, Luleå (SE)

(73) Assignee: Gestamp HardTech AB, Luleå (SE)

(*) Notice: Subject to any disclaimer, the term of this patent is extended or adjusted under 35 U.S.C. 154(b) by 106 days.

(21) Appl. No.: 16/605,581

(22) PCT Filed: May 7, 2018

(86) PCT No.: PCT/EP2018/061693
§ 371 (c)(1),
(2) Date: Oct. 16, 2019

(87) PCT Pub. No.: WO2018/215194
PCT Pub. Date: Nov. 29, 2018

(65) Prior Publication Data
US 2020/0122663 A1 Apr. 23, 2020

(30) Foreign Application Priority Data
May 22, 2017 (SE) ................................. 1750635-3

(51) Int. Cl.
*B60J 7/00* (2006.01)
*B60R 19/18* (2006.01)
*B60R 19/34* (2006.01)

(52) U.S. Cl.
CPC .............. *B60R 19/18* (2013.01); *B60R 19/34* (2013.01)

(58) Field of Classification Search
CPC ....... H01L 2924/00; H01L 2924/00014; H01L 2224/48091; B60R 21/0136;
(Continued)

(56) References Cited

U.S. PATENT DOCUMENTS 4,397,490 A * 8/1983 Evans .................... B60R 19/02
293/120
5,154,462 A * 10/1992 Carpenter ............. B29C 66/547
293/120
(Continued)

FOREIGN PATENT DOCUMENTS

EP        3023305 A1     5/2016
WO       03104030 A2    12/2003
WO     2015079876 A1     6/2015

OTHER PUBLICATIONS

International Search Report and Written Opinion in corresponding International Application No. PCT/EP2018/061693 dated Jul. 5, 2018 (8 pages).

*Primary Examiner* — Kiran B Patel
(74) *Attorney, Agent, or Firm* — Jeffri A. Kaminski; Venable LLP

(57) ABSTRACT

A bumper beam to be arranged horizontally on a motor vehicle, the bumper beam comprising an elongate main cross member produced of a bent plate, wherein the main cross member comprises an elongate bottom portion with two elongate web portions on either side thereof, said elongate bottom portion and elongate web portions being arranged to extend horizontally, when arranged on a vehicle, over at least a first length between two spaced apart attachment sections for attaching the bumper beam to two spaced apart mounting brackets crash boxes, and wherein the web portions are arranged above and below the bottom portion to extend outwards, away from the vehicle when arranged on said vehicle. A patch is arranged along the elongate bottom portion to cover a region that extends horizontally from each attachment section and along at least a section of the first length between two spaced apart attachment sections.

4 Claims, 2 Drawing Sheets

(58) Field of Classification Search
CPC ....... B60R 19/483; B60R 19/18; B60R 19/24; B60R 2019/1813; B60R 2019/1853; G01S 13/931
See application file for complete search history.

(56) References Cited

U.S. PATENT DOCUMENTS

| | | | | |
|---|---|---|---|---|
| 6,231,094 B1* | 5/2001 | Uytterhaeghe | ......... | B29C 43/02 264/257 |
| 8,430,437 B2* | 4/2013 | Asakawa | ................ | B60R 19/34 293/133 |
| 9,358,941 B1* | 6/2016 | Harris | .................... | B60R 19/18 |
| 2003/0211311 A1* | 11/2003 | Porter | .................... | B60R 19/50 428/318.8 |
| 2004/0262931 A1* | 12/2004 | Roussel | ................ | B60R 19/18 293/120 |
| 2005/0116498 A1* | 6/2005 | Kobayashi | .............. | B60R 19/24 296/155 |
| 2006/0022472 A1* | 2/2006 | Omura | .................... | B60R 19/18 293/120 |
| 2006/0043743 A1* | 3/2006 | Shuler | .................... | B60R 19/12 293/120 |
| 2006/0131902 A1* | 6/2006 | Shimoda | ................ | B60R 19/18 293/121 |
| 2006/0261611 A1* | 11/2006 | Mohapatra | .............. | B60R 19/18 293/107 |
| 2007/0120383 A1* | 5/2007 | Schmidt | ................ | B60R 19/34 293/102 |
| 2007/0176442 A1* | 8/2007 | Mori | ....................... | B60R 19/34 293/133 |
| 2009/0085362 A1* | 4/2009 | Terada | ................... | B60R 19/34 293/132 |
| 2009/0167037 A1* | 7/2009 | Czopek | .............. | B29C 66/8322 293/120 |
| 2009/0206618 A1* | 8/2009 | Ralston | .................. | B60R 19/18 293/120 |
| 2010/0102580 A1* | 4/2010 | Brooks | .................. | B60R 19/18 293/133 |
| 2012/0019025 A1* | 1/2012 | Evans | .................. | B62D 35/005 296/193.1 |
| 2012/0223536 A1* | 9/2012 | Muskos | .................. | B60R 19/18 293/132 |
| 2013/0257070 A1* | 10/2013 | Ebara | ...................... | B60R 19/26 293/132 |
| 2014/0284947 A1* | 9/2014 | Nagaya | .................. | B60R 19/34 293/133 |
| 2014/0361560 A1* | 12/2014 | Sakakibara | ............ | B60R 19/34 293/133 |
| 2015/0097384 A1* | 4/2015 | Conrod | ............... | B21B 15/0007 293/102 |
| 2015/0298634 A1* | 10/2015 | Hara | ...................... | B60R 19/24 293/133 |
| 2016/0001724 A1* | 1/2016 | Nilsson | .................. | B60R 19/24 293/154 |
| 2016/0009236 A1* | 1/2016 | Nilsson | .................. | B60R 19/18 293/102 |
| 2016/0144813 A1* | 5/2016 | Clauser | .................. | B60R 19/24 293/133 |
| 2016/0144815 A1* | 5/2016 | Harris | .................... | B60R 19/18 293/142 |
| 2016/0159300 A1* | 6/2016 | Matecki | .................. | B60R 19/18 293/120 |
| 2016/0167609 A1* | 6/2016 | Corwin | .................. | B60R 19/18 293/120 |
| 2016/0244013 A1* | 8/2016 | Mori | ....................... | B60R 19/18 |
| 2016/0280163 A1* | 9/2016 | Matecki | .................... | E04C 3/06 |
| 2017/0028951 A1* | 2/2017 | Shin | ...................... | B60R 19/023 |
| 2017/0036624 A1* | 2/2017 | Yabu | ...................... | B60R 19/03 |
| 2017/0096171 A1 | 4/2017 | Frost et al. | | |
| 2017/0274849 A1* | 9/2017 | Jordan | .................... | B60R 19/24 |
| 2018/0037179 A1* | 2/2018 | Steinebach | ............ | B23K 31/02 |
| 2018/0050736 A1* | 2/2018 | Teshima | .................. | B60R 19/02 |
| 2018/0265023 A1* | 9/2018 | Faruque | ............... | B29C 48/0021 |
| 2019/0232903 A1* | 8/2019 | Newcomb | ............. | B60R 19/023 |
| 2019/0366960 A1* | 12/2019 | Brun | ....................... | B60R 19/18 |
| 2019/0375356 A1* | 12/2019 | Yoshida | ............... | B62D 21/155 |
| 2020/0001930 A1* | 1/2020 | Morisawa | ............... | B60R 19/34 |
| 2020/0017046 A1* | 1/2020 | Min | ....................... | B62D 25/085 |
| 2020/0086815 A1* | 3/2020 | Koga | ...................... | B60R 19/18 |
| 2020/0094760 A1* | 3/2020 | Yamada | ............... | B62D 21/152 |
| 2020/0198565 A1* | 6/2020 | Peru | ........................ | B60R 19/18 |
| 2020/0262372 A1* | 8/2020 | Herisson | ................ | B21D 5/086 |
| 2020/0377046 A1* | 12/2020 | Hashimura | ............. | B23P 19/02 |

* cited by examiner

BUMPER BEAM WITH REINFORCEMENT PATCH

CROSS-REFERENCE TO RELATED APPLICATIONS

This application is a U.S. National Stage application of PCT/EP2018/061693, filed May 7, 2018 and published on Nov. 29, 2018 as WO/2018/215194, which claims the benefit of Swedish Patent Application No. 1750635-3, filed May 22, 2017, all of which are hereby incorporated by reference in their entireties.

TECHNICAL FIELD

The invention relates to a bumper beam. Specifically, the invention relates to such a bumper beam with a reinforcement arranged to increase the ductility of the bumper beam and to improve performance in bumper-to-bumper collisions that is off-set in the sideways direction.

BACKGROUND

Bumper beams are used on vehicles, such as cars, to absorb the major portion of the forces in a frontal collision. Normally a bumper beam is arranged both in the front and in the rear of a vehicle.

In the design and construction of bumper beams there is always a compromise between weight and strength. An advantageous manner of obtaining a good compromise is to provide a bumper beam from a steel plate that is formed into an advantageous shape, typically a hat-profile.

Further, a bumper beam needs to be adapted to withstand different type of collisions. In the testing of the safety of a vehicle, such as a NCAP testing, the vehicle is subjected to a number of different collision tests. One such test that is of particular interest in the US is known in the art as FMVSS301 and is a bumper-to-bumper collision that is off-set in the sideways direction. Such collision will have a high impact force between the crash boxes and in unfavourable cases the bumper beam may rupture or come loose from the attachment point to the crash box Therefore, there is a need of a bumper beam with an improved performance in bumper-to-bumper collisions that is off-set in the sideways direction.

SUMMARY OF THE INVENTION

It is an object of the present invention to provide a bumper beam with improved performance in collisions, especially collisions with an impact zone horizontally just inside of the crash box.

The invention relates to a bumper beam to be arranged horizontally on a motor vehicle, the bumper beam comprising an elongate main cross member produced of a bent plate, wherein the main cross member comprises an elongate bottom portion with two elongate web portions on either side thereof, said elongate bottom portion and elongate web portions being arranged to extend horizontally, when arranged on a vehicle, over at least a first length between two spaced apart attachment sections for attaching the bumper beam to two spaced apart attachment portions on the vehicle, and wherein the web portions are arranged above and below the bottom portion to extend outwards, away from the vehicle when arranged on said vehicle. A patch is arranged along the elongate bottom portion to cover a region that extends horizontally from each attachment section and along at least a section of the first length between two spaced apart attachment sections.

With the arrangement according to the invention an increased performance is achieved in collisions with an impact zone at a region that extends horizontally inwards from each attachment section.

Other embodiments and advantages will be apparent from the detailed description and the dependent claims.

BRIEF DESCRIPTION OF DRAWINGS

An exemplary embodiment related to the invention will now be described with reference to the appended drawings, of which.

DETAILED DESCRIPTION OF EMBODIMENTS

Figure 1:
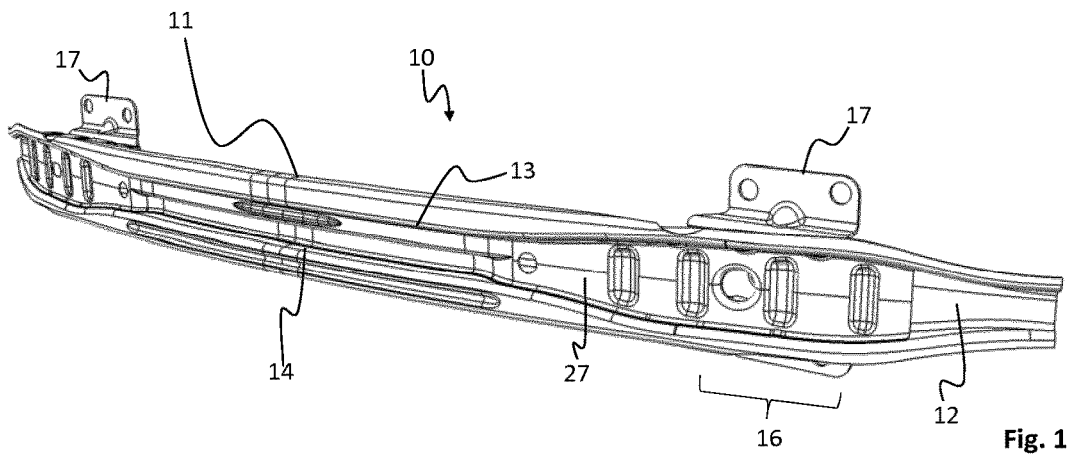
FIG. 1 is a perspective view of a bumper beam with a mounting bracket viewed from the front side.
Figure 2:
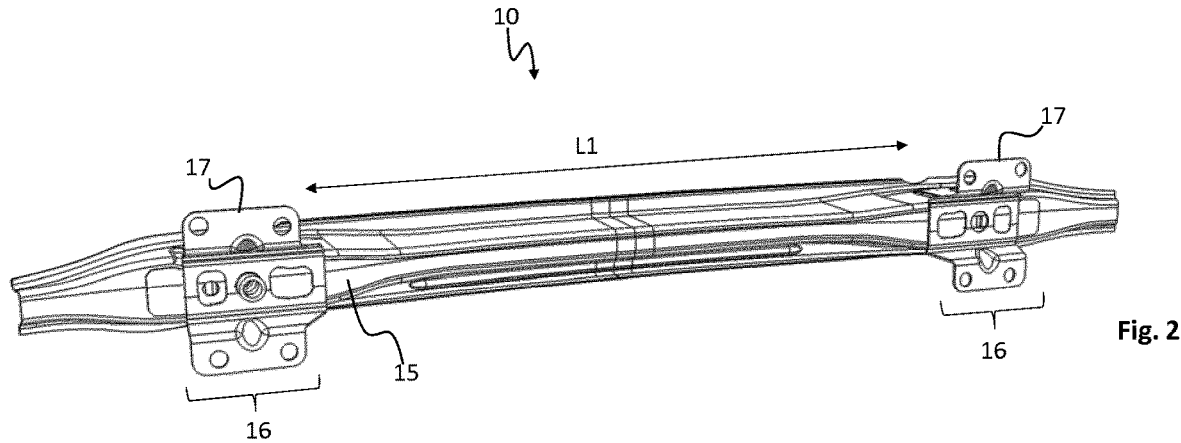
FIG. 2 is a perspective view of a bumper beam with a mounting bracket viewed from the inside.
Figure 3:
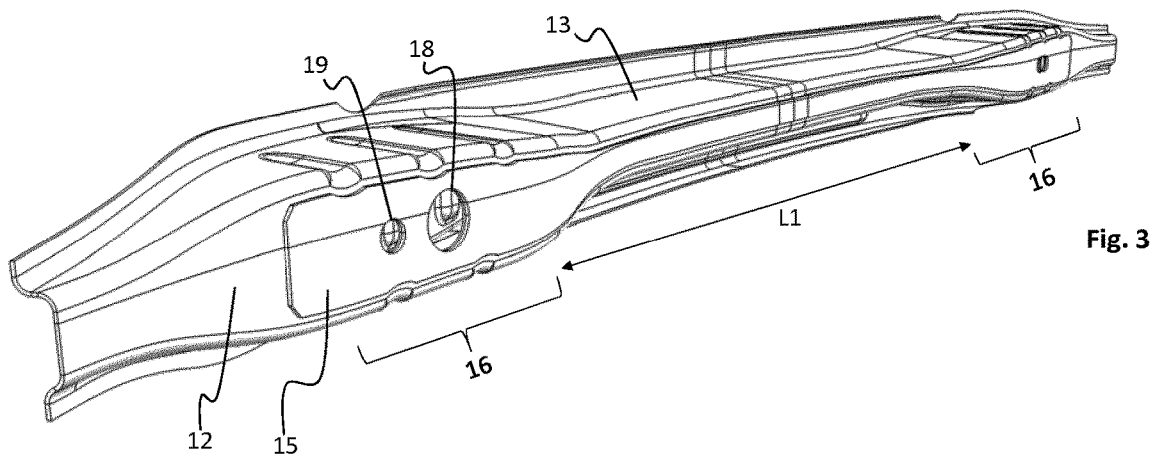
FIG. 3 is a perspective view of a bumper beam viewed from the inside.

In FIG. 1 a bumper beam 10 is shown in a perspective view from the front side with a mounting bracket. In FIG. 2 the same bumper beam 10 is shown in a perspective view from the inside, i.e. the side arranged to face the vehicle.

The bumper beam 10 comprises an elongate main cross member 11 produced of a bent plate, wherein the main cross member 11 comprises an elongate bottom portion 12 with two elongate web portions 13,14 on either side thereof. An upper elongate web portion 13 is arranged above the elongate bottom portion 12, and a lower elongate lower web portion 14 is arranged below the same, wherein the elongate bottom portion 12 and elongate web portions 13,14 are arranged to extend horizontally, when arranged on a vehicle, over at least a first length L1. The first length L1 corresponds to the length between two spaced apart attachment sections 16 for attaching the bumper beam 10 to two spaced apart attachment portions on a vehicle, e.g. via mounting brackets or crash boxes. In FIGS. 1 and 2 the mounting brackets 17 are arranged to connect the bumper beam 10 to the main body of the car (not shown).

The upper and lower elongate lower web portions 13 and 14 extend outwards above and below the bottom portion 12, respectively, away from the vehicle when arranged on said vehicle. As is apparent in FIG. 1 a cover plate 27 is preferably attached to the front side of the main cross member 11, to cover the gap formed between the two elongate web portions 13,14. The cover plate also contributes to a better performance of the bumper beam in a collision.

In accordance with the invention a patch 15 is arranged along at least a part of the elongate bottom portion 12. Advantageously the patch 15 is arranged to cover a region that extends horizontally from each attachment section 16 and along at least a part of the first length L1 between two spaced apart attachment sections 16. The presence of the patch 15 close to attachment section 16 will increase the ductility of the bumper beam in this critical area and drastically decrease the risk of rupture of the bumper beam in a collision with an impact zone just inside one of the attachment sections 16.

As is apparent in the figures, the bottom portion 12 is wider at and around the attachment sections 16, than in the elongate portion between the attachment sections 16. Also, in the shown embodiment, the width of the patch 15 is adapted to width of the elongate bottom portion 12 of the crossmember such that it is wider at and around the attachment sections 16.

Preferably, the patch 15 is arranged on the back side of the bottom portion 12, arranged to face the vehicle when arranged on said vehicle. It may however also be provided on the front side of the bottom portion 12. In the shown embodiment, the patch 15 is arranged the back side of the bottom portion 12, arranged to face the vehicle when arranged on said vehicle. In the shown embodiment, the patch 15 extends along a full first length L1 between two spaced apart attachment sections 16. This is advantageous as it provides a non-broken ductile reinforcement. Further, the patch 15 preferably extends along over at least a portion of the attachment section 16. This is advantageous as it presents a complement to the attachment between the patch and the cross member. Horizontally, the patch 15 may extend over the whole of the attachment section 16.

The patch 15 is arranged horizontally over the elongate bottom portion 12 and may also be arranged to extend vertically over at least a part of at least one web portion 13,14. For a very strong construction the patch 15 may be arranged to extend over both transitions between the bottom portion 12 to the web portions 13,14, and into a part of said web portions 13 and 14. Also in a not shown embodiment, they extend vertically over one web portion or both web portions only at a region close to the attachment sections 16.

In the shown embodiment, the patch 15 comprises a circular opening 18 in line with one of the attachment sections 16 for attachment of tow hook. In the embodiment shown in FIGS. 2 and 4, a tow hook tube 20 is welded inside said circular opening 18. The mounting bracket 17 comprises a corresponding opening for allowing passage of the tow hook tube 20. Further, the patch 15 comprises guide holes 19 for guiding and positioning of the patch during production.

Figure 4:
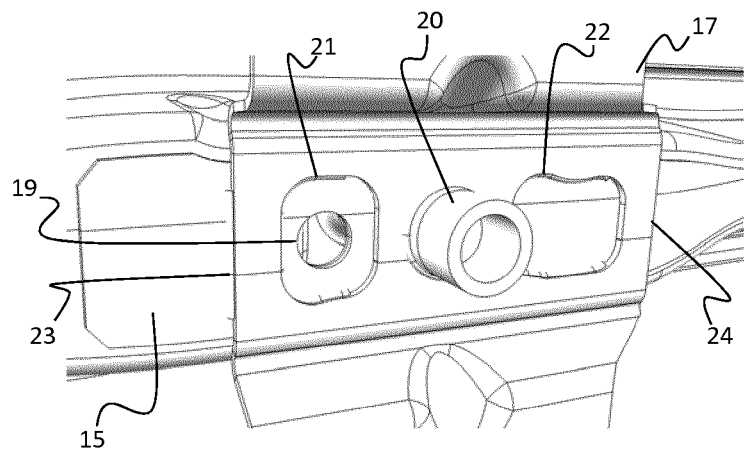
FIG. 4 is a detailed view of the bumper beam in FIG. 3.

As is apparent from FIG. 4, the mounting bracket 17 comprises two openings 21 and 22, which are arranged to allow the mounting bracket 17 to be attached to the bumper beam, e.g. by means of welding or soldering. Welds, such as point welds, LASER-welds or the like are provided around the contours of the openings 21 and 22. The welds may be provided around parts of the openings 21 and 22 or around the whole contour thereof. Further a weld may be provided along the sides 23 and 24 of the mounting bracket 17. Specifically, a weld is preferable provided along the outer side 23 of the mounting bracket 17. It may be advantageous not to provide a weld along the inner side 24 of the mounting bracket 17 as this is a delicate zone where a heat affected zone or the like from a weld could have a negative effect on the performance of the bumper beam.

Figure 5:
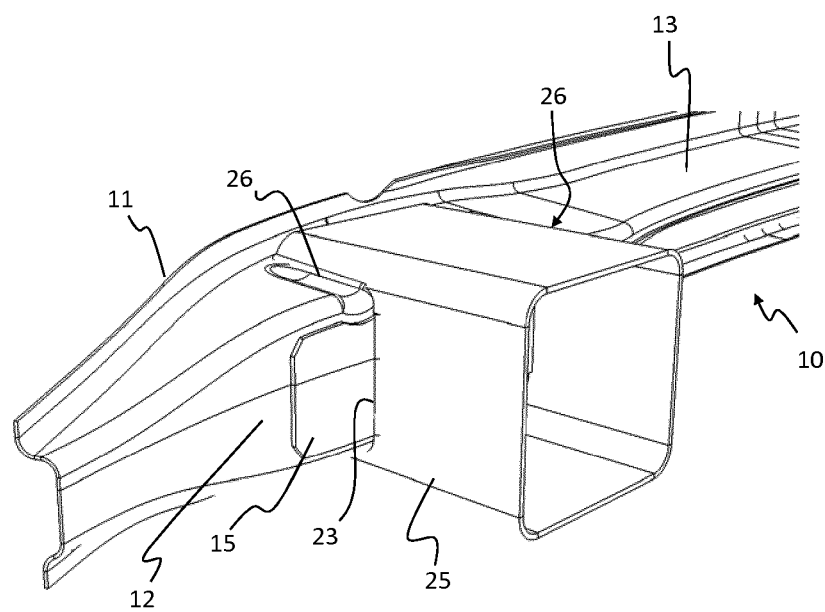
FIG. 5 is a detailed view of a bumper beam arranged on a crash box.

An alternative way mounting the inventive bumper beam 10 to a vehicle is shown in FIG. 5, in which the bumper beam is attached to crash boxes 25 that in turn are connect the body of the vehicle. The bumper beam 10 may be welded to each crash box 25 by means of an outer weld 23 between the outer side of the crash box 23 and the patch 15. Further, an upper and/or lower weld 26 may be provided between an upper or lower portion of the crash box 25 and the upper and lower elongate web portions 13 and 14, respectively. Such a weld 26 may hence advantageously be arranged on both sides of the crash box along the upper elongate web portion 13 and/or on both sides the lower elongate web portion 14 (not shown). The crash box 25 is preferably designed to enclose the shape of the bumper beam, with recesses on both sides to allow insertion of the bumper beam.

The patch is preferably a steel plate, which preferably is attached to the bumper beam by welding. In an advantageous method of producing the bumper beam with attached patch, the patch is welded to a flat blank, which is subsequently press hardened together with the patch. It is advantageous to harden the bumper with the welded patch as such a procedure allows the welds to harden with both the patch and the main cross member, such that the negative effect of any heat affected zones (HAZ) is neutralized. Further, it is advantageous to press harden the patch together with the main cross member as it allows the patch to smoothly follow the contour of the main cross member. The patch is advantageously made of a steel blank with a greater thickness than the main cross member. The greater thickness is advantageous both as it provides more strength to the construction, but also as it presents a better support for the welds, for welding the bumper beam to mounting brackets 17 or the crash boxes 25.

The patch may also be made of fibre reinforced polymer, e.g. CFRP, in which case it is attached to the bumper beam by means of an adhesive, after press hardening of the main cross member. If a patch of fibre reinforced polymer is used, the mounting brackets 17 or crash boxes 25 need to be fastened directly to the main cross member. Holes may be provided in the patch of fibre reinforced polymer to allow said bracket or crash box to be welded to main cross member.

Above, the invention has been described with reference to specific embodiments. The invention is however not limited to these embodiments. It is obvious to a person skilled in the art that other embodiments are possible within the scope of the following claims.

The invention claimed is:

1. A bumper beam to be arranged horizontally on a motor vehicle, the bumper beam comprising an elongate main cross member produced of a bent plate, wherein the main cross member comprises an elongate bottom portion with two elongate web portions on either side thereof, said elongate bottom portion and elongate web portions being arranged to extend horizontally, when arranged on a vehicle, over at least a first length between two spaced apart attachment sections for attaching the bumper beam to two spaced apart attachment sections of vehicle, and wherein the web portions are arranged above and below the bottom portion to extend outwards, away from the vehicle when arranged on said vehicle, wherein a patch is arranged along the elongate bottom portion to cover a region that extends horizontally from each attachment section, which patch is arranged to extend along the full first length between two spaced apart attachment sections, wherein the patch horizontally extends over the whole of the attachment section, and wherein the patch is arranged at the back side of the bottom portion, arranged to face the vehicle when arranged on said vehicle.

2. The bumper beam according to claim 1, wherein the patch comprises attachment means in both attachment sections for attachment to mounting brackets or crash boxes.

3. The bumper beam according to claim 1, wherein the patch is a steel plate.

4. The bumper beam according to claim 1, wherein the patch is a plate made of fibre reinforced polymer.

* * * * *